Dec. 2, 1958  J. W. WABER  2,862,578
VEHICLE RUNNING GEAR
Filed May 2, 1952

INVENTOR
James W. Waber
BY
ATTORNEY

United States Patent Office 2,862,578  
Patented Dec. 2, 1958

2,862,578
VEHICLE RUNNING GEAR

James W. Waber, Chicago, Ill.

Application May 2, 1952, Serial No. 285,820

3 Claims. (Cl. 188—18)

This invention relates to vehicle running gear and particularly to a novel interrelationship of the steering and braking aspects thereof.

Whereas it has been proposed in the past to pivot the front wheels of vehicles with respect to their axles about axes passing through the central planes of the wheels, and it has been proposed in separate and unrelated mechanisms to utilize brakes wherein a pressure plate is advanced axially of a wheel for frictional engagement with a braking surface carried by the wheel, prior to this time, there has been no practicable proposal whereby these individual improvements could be combined. In accordance with the present invention, these features have not only been combined but have been so interrelated that each has contributed to the other in producing results that could not have been predicted.

By virtue of the improved steering and braking mechanism, the troublesome effects of camber, caster, steering geometry and toe-in have been eliminated and there is no longer any need to interchange tires because of the uneven wear that has always occurred heretofore. The structures contemplated utilize parts which are relatively simple, few in number and inexpensive to produce and maintain. Moreover, the invention is as readily applicable to existing vehicles as to new ones.

The vehicle running gear of the present invention comprises a pair of wheel hubs, a rigid substantially horizontal axle terminating within the hubs and pivoted thereto for movement about substantially vertical axes, a wheel rotatably received by each of the hubs, each of the wheels providing a braking surface, a braking member carried by each hub and movable relative thereto for cooperation with the braking surfaces, and means for retaining the wheels on the hubs.

It is among the objects of the invention to provide such vehicle running gear comprising a rigid axle having a horizontal axis, a hub member having an opening receiving an end of the axle and pivoted for movement with respect thereto about a vertical axis, a wheel mounted on the hub member for rotation about the horizontal axis and dirigible with the hub member about the vertical axis, the wheel having a radial plane including its center of mass and the vertical axis, and a braking element axially movably mounted on the hub member selectively engageable with a portion of the wheel. Preferably, the braking element and portion of the wheel to be engaged are annular and the braking element is preferably threadedly engaged with a portion of the hub member. Moreover, the direction of the thread interconnecting the braking element with the hub is preferably such that there will be no tendency to lock the brakes during forward motion of the vehicle. Locking of the brakes during reverse movements of the vehicle will be prevented by interposing suitable stops to limit movement of the braking elements to that required under ordinary reversing conditions. The braking element and the portion of the wheel engaged thereby preferably provide surfaces inclined to the horizontal and vertical axes, such surfaces assuming in a preferred embodiment of the invention, a frusto conical form.

Each end of the rigid axle preferably contains an aperture having a vertical axis and each hub member preferably contains a pair of aligned apertures registrable with the axle aperture, a pivot pin penetrating these apertures to provide for steering movements of the hub member relative to the axle about a vertical axis. Suitable bearings are provided between the axle and hub member on the one hand and between the hub member and wheel on the other. Suitable provision is contemplated to retain the wheel on the hub member for rotation with respect thereto and various forms of wheels can be employed to provide for the ready application and removal of standard tires.

A more complete understanding of the invention will follow a detailed description of the accompanying drawings wherein.

Figure 1:
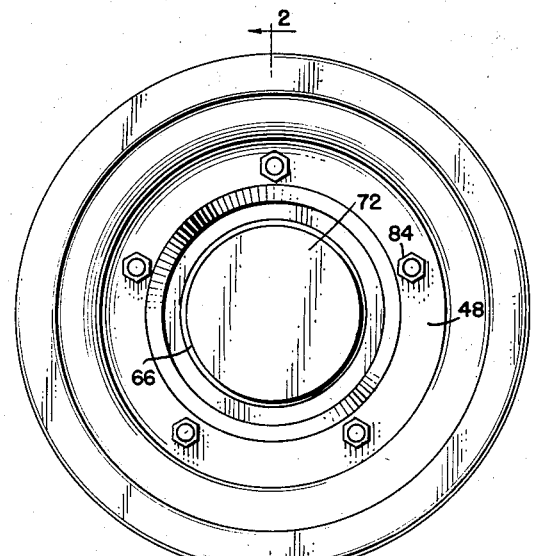
Fig. 1 is an elevation of a wheel suitable for incorporation of the invention.
Figure 3:
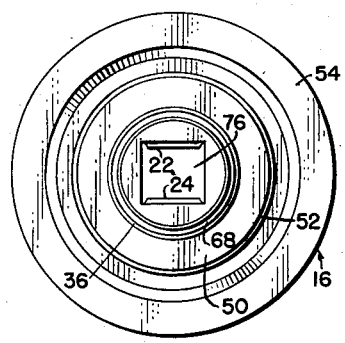
Fig. 3 is an elevation of the hub member as it would appear from the left end of Fig. 2.
Figure 2:
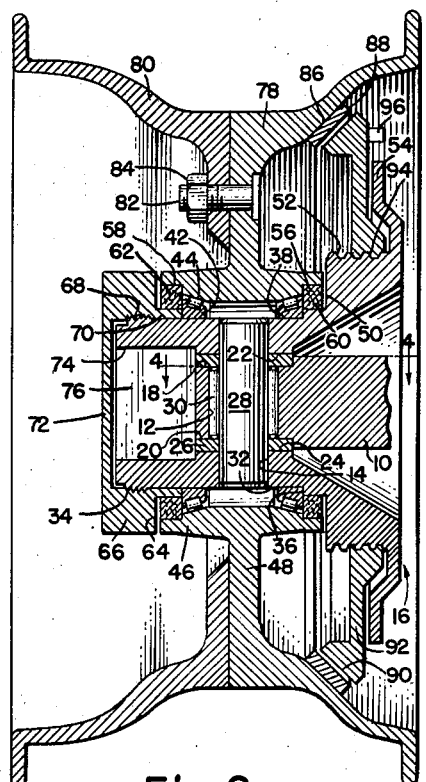
Fig. 2 is a section taken along line 2—2 of Fig. 1, depicting an application of the invention.
Figure 4:
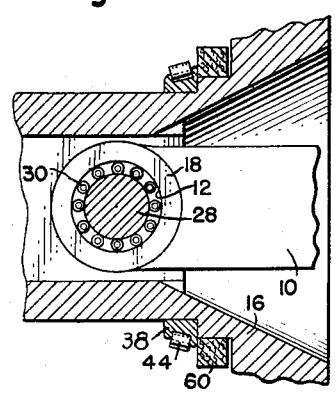
Fig. 4 is a fragmentary section taken along line 4—4 of Fig. 2.

The axle 10, as shown in Figs. 2 and 4 contains an aperture 12 adjacent each end thereof, registrable with aligned apertures 14 formed intermediately of a hub member 16. The terminal portions of the axle 10 are provided with substantially plane upper and lower surfaces 18 and 20 respectively for cooperation with similarly plane surfaces 22 and 24 respectively, defining the internal upper and lower surfaces of the intermediate portion of the hub member 16. Interposed between the corresponding plane surfaces of the axle and hub members, are thrust washers 26. Penetrating the aligned apertures of the axle and hub member, pivot pins 28 are provided, and suitable roller bearings 30 are interposed between these pivot pins and the axle apertures 12.

The hub member 16 has an outer cylindrical surface 32 having external threads 34 near its left end, as viewed in Fig. 2, and a step 36 at its right end to serve as a stop for a bearing race 38 supporting suitable roller bearings 40. A similar bearing race 42 supporting roller bearings 44 is arranged to the left of the aperture 14, these two sets of bearings supporting the inner flange or hub 46 of a wheel 48. To the right of the shoulder 36 as viewed in Fig. 2, the hub member provides another radial shoulder 50 defining a flange on whose outer periphery, acme threads 52 are formed, extending axially of the hub member to a terminal flange 54. The inner flange or hub 46 of the wheel 48 is provided with counterbores 56 and 58 which receive packing rings 60 and 62 respectively, the packing ring 60 being contained by the radial shoulder 50 of the hub member and the packing ring 62 being contained by the radial wall 64 of a nut 66 whose internal threads 68 cooperate with the threads 34 formed near the left end of the hub member 16. A forwardly directed projection 70 formed integral with the nut 66 positions the race 42 and serves as a wiping surface for the packing ring 70. The space defined between the radial wall 72 of the nut and the counterbore 74 in the left end of the hub member 16 serves as a lubricant chamber 76.

Integral with the central flange or web of the wheel 48 is a rim portion 78 to which a separable rim portion 80 can be secured by suitable bolts 82 and nuts 84. On an inclined portion 86 of the integral rim portion 78 is secured a braking surface 88 of substantially frusto conical form for cooperation with a similarly frusto conical surface 90 provided by a pressure plate 92 provided with central internal threads 94 for cooperation with the acme threads 52 provided on the flange of the hub member. An actuator 96 carried by the braking member 92 serves for the application of braking forces by any suitable means, causing the braking member to advance on the threads 52 until sufficient frictional engagement is established between it and the braking surface 88 to provide the desired degree of deceleration of the vehicle. Preferably, the threads 52 are of such hand as would be opposed to the direction of rotation of the wheel when the vehicle is moving in a forward direction. In this way, locking of the brakes at high speed would not be possible. Whereas locking of the brakes when the vehicle is moving in reverse would not be serious under ordinary circumstances, this too can be avoided by the provision of suitable stops to limit the degree of advance of the brakes during reverse movements.

It will be noticed that the threads 52 formed on the hub members will have one direction for left wheels and another direction for right wheels. Otherwise, the parts of the mechanism described are completely interchangeable for either right or left wheels.

To assemble the mechanism depicted in Fig. 2, the bearings 30 and thrust washers 26 will be assembled at the end of the axle 10, whereupon the hub member 16 will be moved into place on the axle until its registering apertures 14 are aligned with the aperture 12 of the axle, whereupon the pivot pin 28 will be inserted and driven home. Then the braking member 92 will be threaded to its position on the flange of the hub member, the packing ring 60 applied, the race 38 and its rollers 40 positioned, and the wheel 48 mounted. Then the race 42 with its bearings 44 will be applied, followed by the packing ring 62 and the nut 66. The nut will be adjusted to its required position and the assembly will then be complete. Suitable lubricant will be introduced at the various points requiring it during the course of the assembly, as is customary in such operations.

Inasmuch as the braking surface and braking member are annular, application of the braking forces will have no tendency to disturb the steering forces, and similarly, since the axial arrangements provided for the steering are not complicated by caster, camber, toe-in and the usual steering geometry, there is no tendency to disturb the uniform braking effects. It is believed that applicant has for the first time produced such an interaction of steering and braking and although the invention has been illustrated in only one of its possible forms, it can assume many others as will be evident to those skilled in the art. Accordingly, the invention should not be rstricted to the single application illustrated and described beyond the scope of the appended claims.

Since the braking surface 88 will ordinarily be in the form of a lining which is a poor conductor of heat as compared with metal, the fact that it is fixed to the rim will prevent transmission of excessive heat generated by braking to the tires and their inner tubes.

Where self actuation of the brakes is desirable for forward speeds, it is merely necessary to interchange the right and left wheels of this invention to achieve it. Under such conditions, the pitch of the acme threads 52 and 94 will be made small enough to avoid the dangers of rapid locking. A relationship which has operated satisfactorily in this regard produces one inch of advance of the pressure plate 92 for each twenty-eight degrees of its rotation.

I claim:

1. Vehicle running gear comprising a wheel element containing an axle receiving opening, said element having a substantially radial web and a rim integral with and diverging from said web and disposed transversely thereof, said rim terminating in a radial flange and having an outer surface for receiving a tire and an inner surface for receiving a braking member, and a brake lining poorly heat conductive as compared with metal directly secured to said inner surface.

2. Vehicle running gear as set forth in claim 1 wherein said inner surface is disposed at an obtuse angle with respect to said web.

3. A vehicle wheel comprising a radial web, a rim integral with said web and extending transversely thereof, said rim having an outer surface for reception of a tire and an inner surface for reception of a braking member, and a brake lining poorly heat conductive as compared with said rim directly secured to the inner surface of said rim.

References Cited in the file of this patent

UNITED STATES PATENTS

| 1,599,614 | Frederickson | Sept. 14, 1926 |
| 1,761,044 | Marcum | June 3, 1930 |
| 1,831,125 | Lambert | Nov. 10, 1931 |
| 1,926,550 | Metz | Sept. 12, 1933 |
| 1,951,363 | Kopf | Mar. 20, 1934 |
| 1,990,890 | Barber | Feb. 12, 1935 |
| 2,065,088 | Mueller | Dec. 22, 1936 |
| 2,430,936 | Kraft | Nov. 18, 1947 |
| 2,471,956 | Holl | May 31, 1949 |
| 2,551,448 | McGuire | May 1, 1951 |

FOREIGN PATENTS

| 520,859 | France | July 2, 1921 |
| 790,313 | France | Nov. 19, 1935 |
| 519,985 | Great Britain | Apr. 11, 1940 |